(12) United States Patent
Lee (10) Patent No.: US 7,415,203 B2
(45) Date of Patent: Aug. 19, 2008

(54) METHOD AND APPARATUS FOR CONTROLLING AUTOMATIC EXPOSURE IN A CAMERA

(75) Inventor: Hyung-Guen Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 11/174,806

(22) Filed: Jul. 5, 2005

(65) Prior Publication Data

US 2005/0271379 A1 Dec. 8, 2005

(30) Foreign Application Priority Data

Jul. 6, 2004 (KR) .................. 10-2004-0052177

(51) Int. Cl.
- G03B 7/08 (2006.01)
- G03B 13/10 (2006.01)
- G03B 7/083 (2006.01)
- G03B 7/093 (2006.01)
- G01J 1/00 (2006.01)

(52) U.S. Cl. .............. 396/233; 396/232; 396/246; 356/213

(58) Field of Classification Search ............ 396/169, 396/232–234, 246; 348/36; 356/213
See application file for complete search history.

(56) References Cited

U.S. PATENT DOCUMENTS

| | | | | |
|---|---|---|---|---|
| 4,395,099 A | * | 7/1983 | Terasita | 396/50 |
| 4,937,611 A | * | 6/1990 | Miyazaki | 396/234 |
| 5,664,242 A | * | 9/1997 | Takagi | 396/234 |
| 5,678,098 A | * | 10/1997 | Ishihara et al. | 396/233 |
| 6,240,253 B1 | * | 5/2001 | Yamaguchi et al. | 396/61 |
| 6,275,659 B1 | * | 8/2001 | Ishihara et al. | 396/233 |
| 6,349,175 B1 | * | 2/2002 | Tokunaga | 396/157 |
| 6,625,398 B1 | * | 9/2003 | Nonaka | 396/121 |
| 2001/0016117 A1 | * | 8/2001 | Hirai et al. | 396/225 |
| 2002/0136551 A1 | | 9/2002 | Ishihara et al. | |
| 2004/0190890 A1 | * | 9/2004 | Osawa | 396/234 |

OTHER PUBLICATIONS

Japanese Patent Application No. 2001-100040 to Takahashi, having Publication date of Oct. 11, 2002 (w/ English Abstract page).
Japanese Patent Application No. 06-127419 to Ishihara, having Publication date of Dec. 22, 1995 (w/ English Abstract page).
Korean Patent Application No. 1020010060727 to Ji et al., having Publication date of Apr. 7, 2003 (w/ English Abstract page).

* cited by examiner

Primary Examiner—W. B. Perkey
Assistant Examiner—Andrew Williams
(74) Attorney, Agent, or Firm—Monica H. Choi (57) ABSTRACT

For controlling exposure in a camera, first and second brightness levels of first and second areas of a captured image are determined. First and second weight values for the first and second brightness levels are determined with an increase of the first weight value for a higher difference between the first and second brightness levels. Exposure control data is generated from the first and second weight values and the first and second brightness levels.

18 Claims, 6 Drawing Sheets

METHOD AND APPARATUS FOR CONTROLLING AUTOMATIC EXPOSURE IN A CAMERA

BACKGROUND OF THE INVENTION

This application claims priority under 35 USC § 119 to Korean Patent Application No. 2004-52177, filed on Jul. 6, 2004, the contents of which are herein incorporated by reference in its entirety for all purposes.

1. Field of the Invention

The present invention relates generally to camera systems, and more particularly to a method and apparatus for controlling automatic exposure in a camera.

2. Description of the Related Art

Portable terminals, such as personal communication systems (PCS) and cellular phones, have become increasingly popular. Particularly, the portable terminal with a built-in camera, referred to as a camera phone, is widely used. In such a camera, an exposure time of each pixel needs to be controlled according to lighting conditions. When the exposure time is too long, an image may be overly bright. In contrast, when the exposure time is too short, an image may be too dark.

Conventional automatic exposure (AE) control systems adjust the exposure time of each pixel to compensate for variations in brightness of the image, which includes a subject and a surrounding (or background). The automatic exposure (AE) controls a shutter speed of the camera to maintain a brightness level of the captured image.

When the image is captured and converted to digital image data during digital image processing, an average brightness of the digital image data of each pixel is determined based on the brightness of the whole scene. The extracted average brightness is used as an input to the automatic exposure to control the exposure time so that the brightness of the image has a target value.

In conventional exposure control, an average brightness of the whole area of the captured image is used as the input to the automatic exposure. Therefore, when a light source such as the sun is positioned at a rear of the subject (back-lighted), the average brightness is relatively high despite the relatively large brightness difference between the subject and the background. Accordingly, the main subject may be under-exposed (i.e., the subject is too dark). When the light source is positioned at a front of the subject (front-lighted), the main subject may be over-exposed (i.e., the subject is too bright). Therefore, the conventional automatic exposure may not effectively compensate for such front-lighted or back-lighted scenes.

To compensate for the back-lighted or front-lighted scene, U.S. Patent Application Publication Number No. 2002-0136551 provides exposure control with comparison of brightness levels for a central area and a peripheral area of the captured image to determine whether the scene is back-lighted or front-lighted. The exposure control data is determined according to a logarithmic relationship with the brightness levels and with a correction coefficient that is determined according to a distance of the subject from the camera. In addition, such a correction coefficient is predefined and stored in memory.

Additionally, Japanese Patent Application Publication No. 2002-300468 discloses exposure control that divides the captured image into at least two areas to apply given weight values to the respective areas. When a ratio of a brightness of a predetermined area to a brightness of another area is greater than a given value, it is determined whether the scene is back-lighted so that the weight values applied to the respective areas are modified. However, a correction coefficient for each of the divided areas is predefined, and the brightness difference between the respective areas is not used in the exposure control.

Furthermore, power consumption is desired to be reduced in a mobile communication system such as a mobile phone or a personal digital assistant (PDA). In addition, simpler hardware is desired for reducing the thickness and size of the portable terminal.

Thus, an automatic exposure control amenable for mobile application devices is desired, particularly with accurate control of automatic exposure in the camera.

SUMMARY OF THE INVENTION

In a method and apparatus for controlling exposure in a camera, first and second brightness levels of first and second areas, respectively, of a captured image are determined. In addition, first and second weight values for the first and second brightness levels, respectively, are determined with an increase of the first weight value for a higher difference between the first and second brightness levels. Furthermore, exposure control data is generated from the first and second weight values and the first and second brightness levels.

In one embodiment of the present invention, the first area includes a photographed subject, and the second area corresponds to a background.

In another embodiment of the present invention, the exposure control data is generated by summing a product of the first brightness level and the first weight value and a product of the second brightness level and the second weight value.

In a further embodiment of the present invention, a shutter speed of the camera is adjusted based on the exposure control data.

In an example embodiment of the present invention, the second weight value is set to about zero, and the first weight value is set to about one or more, when the first brightness level is greater than the second brightness level and the brightness difference between the first and second brightness levels is greater than or equal to a first threshold value.

In another example embodiment of the present invention, the second weight value is set to about zero, and the first weight value is set to about two or more, when the first brightness level is greater than the second brightness level and the brightness difference between the first and second brightness levels is greater than or equal to a first threshold value and a second threshold value.

In a further example embodiment of the present invention, the second weight value is set to about zero, and the first weight value is increased from 1 to 2 with the higher difference between the first and second brightness levels, when the first brightness level is greater than the second brightness level and the brightness difference between the first and second brightness levels is greater than or equal to a first threshold value but less than a second threshold value.

In another example embodiment of the present invention, the first and second weight values are set each to about ½, when the first brightness level is not greater than the second brightness level and the brightness difference between the first and second brightness levels is greater than or equal to a third threshold value.

In a further example embodiment of the present invention, the first weight value is set to about 1, and the second weight value is set to about zero, when the first brightness level is not greater than the second brightness level and the difference between the first and second brightness levels is less than the third threshold value but greater than or equal to a fourth threshold value.

In another embodiment of the present invention, the first weight value is set to increase from about ½ to about 1, and the second weight value is set to decrease from about ½ to about zero, with the higher difference between the first and second brightness levels when the first brightness level is not greater than the second brightness level and the difference between the first and second brightness levels is less than the third threshold value and a fourth threshold value.

In one embodiment of the present invention, the first weight value is increased, and the second weight value is decreased, linearly with the difference between the first and second brightness levels. In another embodiment of the present invention, the first weight value is increased, and the second weight value is decreased, exponentially with the difference between the first and second brightness levels.

In this manner, the first brightness level is assigned increased weight value for the higher difference between the first and second brightness levels. Thus, the exposure time is more increased for the back-lighted scene, and is more decreased for the front-lighted scene.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, and 7 refer to elements having similar structure and/or function.

DETAILED DESCRIPTION OF THE INVENTION

Figure 1:
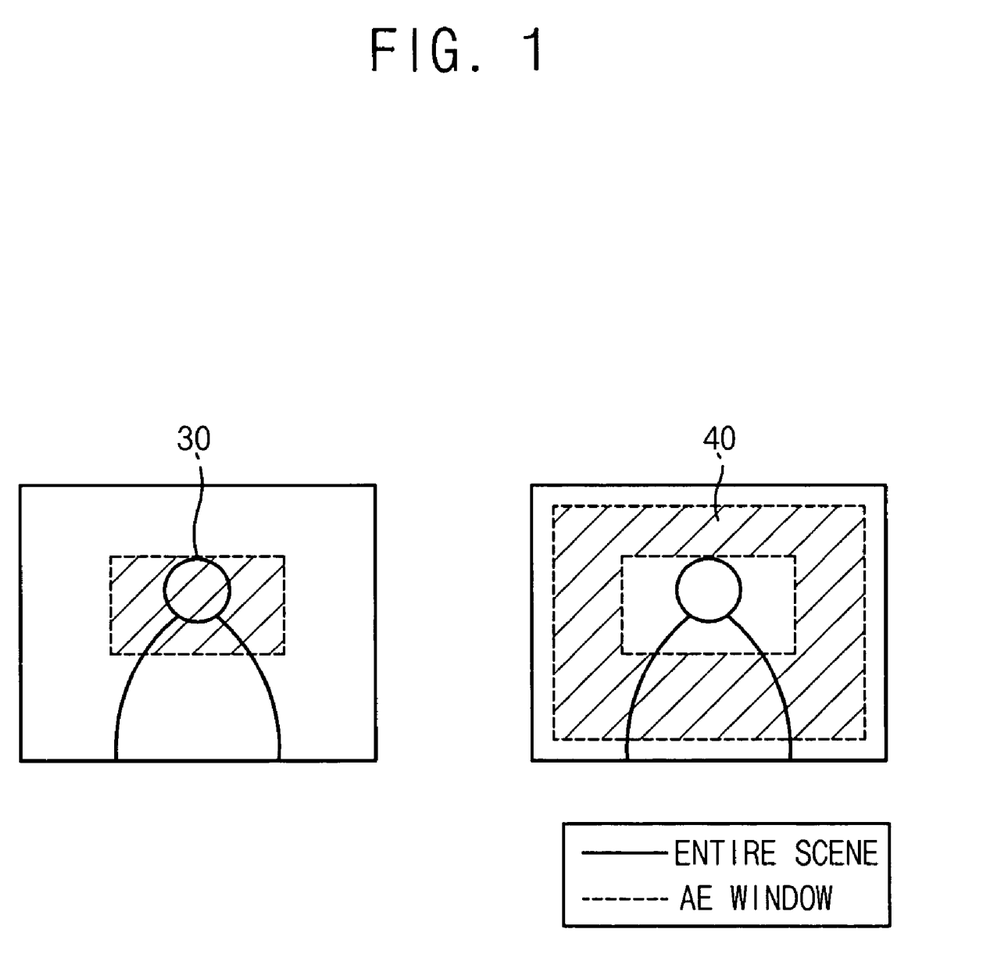
FIG. 1 shows first and second areas of a captured image, according to an example embodiment of the present invention.
Figure 2:
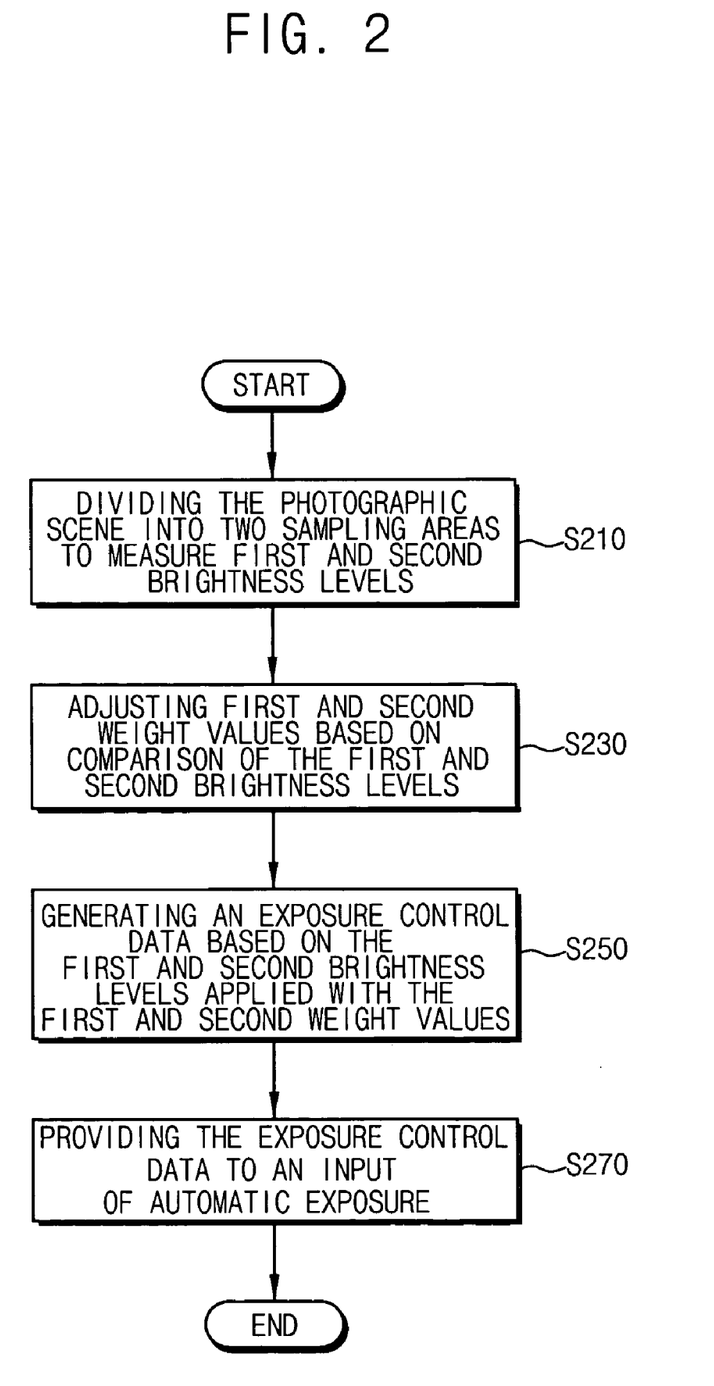
FIG. 2 is a flowchart of steps for controlling automatic exposure in a camera, according to an example embodiment of the present invention.

FIG. 1 shows a captured image divided into a first area 30 and a second area 40, according to an example embodiment of the present invention. FIG. 2 is a flowchart of steps for control of automatic exposure in a camera, according to an example embodiment of the present invention.

Referring to FIG. 1, the first area 30 of a captured image in a camera includes a main photographed subject, and the second area 40 includes a background scene, in one embodiment of the present invention. Generally, the main subject to be captured is mostly positioned in a central area that is the first area 30 of the captured image. In that case, the second area 40 corresponds to a peripheral area surrounding the main subject. In addition, the present invention may be practiced when the captured image is divided into two or more areas to measure respective brightness levels thereof.

Referring to FIG. 2, a first brightness level is extracted from the first area 30, and a second brightness level is extracted from the second area 40 (step S210 of FIG. 2). For example, the first and second brightness levels are each determined as a respective average brightness of the first and second areas 30 and 40, respectively.

The first brightness level is compared with the second brightness level to adjust first and second weight values that are applied to (such as multiplied with) the first and second brightness levels, respectively (step S230 of FIG. 2). The adjusted first and second weight values are applied to the first and second brightness levels for generating exposure control data (step S250 of FIG. 2). For example, the first and second weight values may each be between about 0 to about 1.

The first brightness level being larger than the second brightness level indicates that the subject is brighter than the background (i.e. front-lighted). In that case, the first weight value for the first brightness level is increased (while the second weight value of the second brightness level may be decreased). Thus, the first brightness level having a relatively large value has more effect on the automatic exposure for further reducing the exposure of an image sensor in the camera.

On the other hand, the second brightness level being larger than the first brightness level indicates that the subject is darker than the background (i.e. back-lighted). In that case also, the first weight value for the first brightness level is increased (while the second weight value of the second brightness level may be decreased). Thus, the first brightness level even having a relatively small value has more effect on the automatic exposure and increases the exposure of the image sensor.

Assuming that the photographed subject is placed at the first area 30, the first weight value for the first brightness level is increased (while the second weight value of the second brightness level may be decreased) with a higher difference between the first and second brightness levels. Thus, the brightness of the photographed subject has more effect in the exposure control.

In other words, when the brightness of the subject is greater than the brightness of the background, the relatively high brightness of the subject is provided to the input of the automatic exposure with higher weight value to decrease the exposure time (or increase the shutter speed). On the other hand, when the brightness of the background is greater than the brightness of the subject, the relative low brightness of the subject is provided to the input of the automatic exposure also with higher weight value to increase the exposure time.

Based on the exposure control data, the exposure time is adjusted by controlling a speed of an electric shutter of the camera (step S270 of FIG. 2). Particularly, the exposure control data is provided to the input of the automatic exposure to be compared with a target value. When the exposure control data is greater than the target value, the exposure time is decreased, and when the exposure control data is less than the target value, the exposure time is increased.

Figure 3:
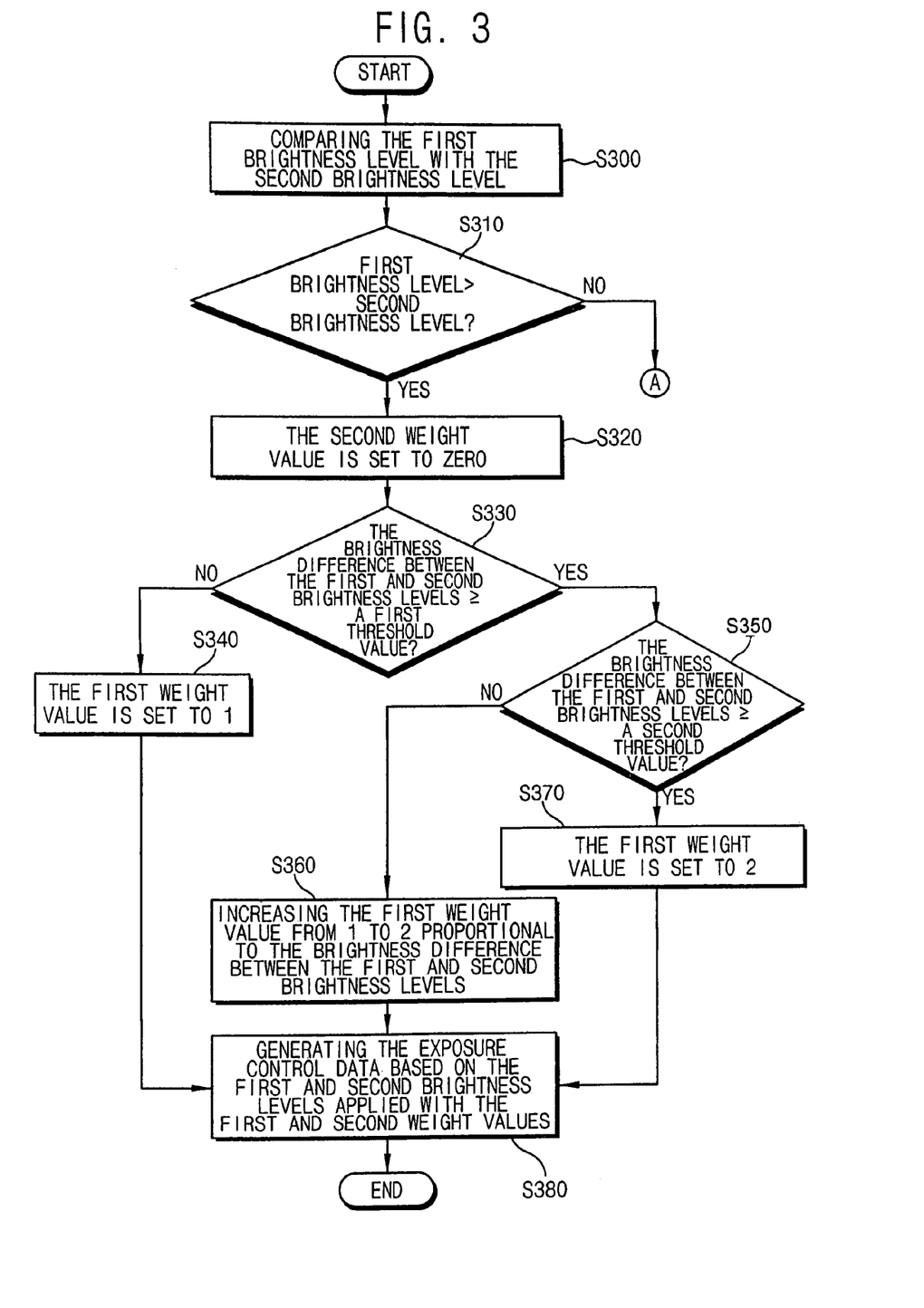
FIGS. 3 and 4 are flowchart of steps for adjusting weight values in FIG. 2 according to an example embodiment of the present invention.
Figure 4:
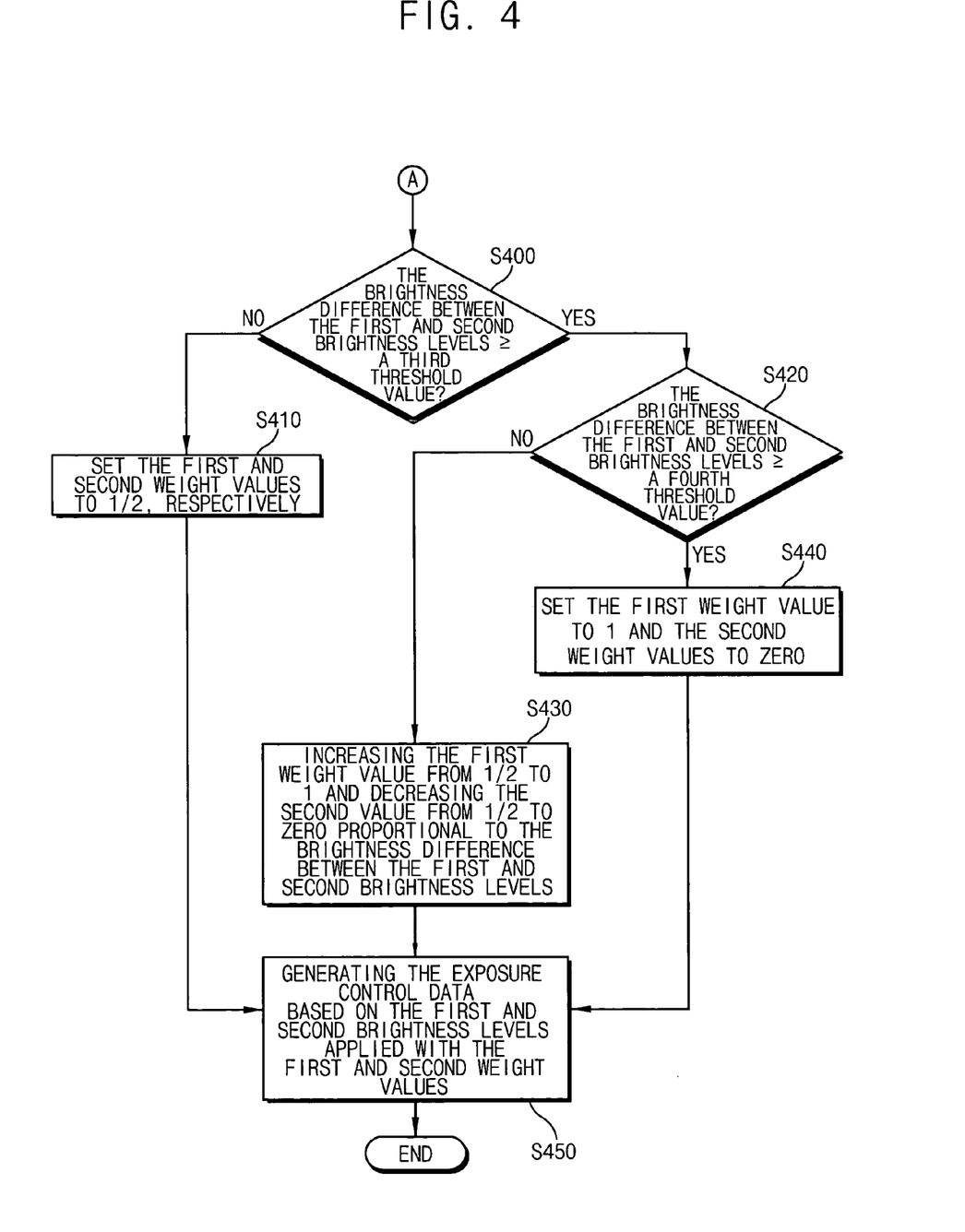

In this manner, the difference between the brightness levels for the photographed subject and the background affects the exposure control for more precise exposure adjustment. FIGS. 3 and 4 are flowcharts of steps for adjusting the first and second weight values in FIG. 2, according to an example embodiment of the present invention.

Referring to FIG. 3, the first brightness level is compared with the second brightness level (step S300 of FIG. 3). When the first brightness level is greater than the second brightness level (step S310 of FIG. 3), the photographed subject is determined to be brighter than the background. In that case, the first brightness level is desired to affect the exposure control data more than the second brightness level such that the exposure time is more decreased. For example, when the difference between the first and second brightness levels is higher, the probability that the captured image is front-lighted is higher so that the first weight value applied to the first brightness level is increased for decreasing the exposure time.

Particularly, when the first brightness level is greater than the second brightness level, the second weight value applied to the second brightness level is set to a small value, for example about 0 (step S320 of FIG. 3). In that case, only the first brightness level is used for the automatic exposure control. In addition, the first weight value applied to the first brightness level is determined depending on the difference between the first and second brightness levels.

The difference between the first and second brightness levels is compared with a first threshold value (T1 in FIG. 5) (step S330 of FIG. 3). When the difference between the first and second brightness levels is less than the first threshold value, the probability that the scene is front-lighted is small so that the first weight value is set to have a first value, for example about one (step S340 of FIG. 3). In that case, the first brightness level is provided as the exposure control data.

When the difference between the first and second brightness levels is greater than or equal to the first threshold value, the difference between the first and second brightness levels is further compared with a second threshold value (T2 in FIG. 5) (step S350 of FIG. 3). When the difference between the first and second brightness is less than the second threshold value, the first weight value is increased between the first value (e.g., 1) and a second value (such as about 2 for example) in proportion to the difference between the first and second brightness levels (step S360 of FIG. 3). Namely, the first weight value is set to be higher for a correspondingly higher difference between the first and second brightness levels.

When the difference between the first and second brightness levels is greater than or equal to the second threshold value, the probability that the scene is front-lighted is large so that the first weight value applied to the first brightness level is set to have the second value such as about 2 (step S370 in FIG. 3).

Based on the set first and second weight values, the exposure control data is generated (step S380 in FIG. 3). For example, when the second weight value is set as 0, the first brightness level multiplied by the first weight value is provided as the exposure control data.

Referring to FIG. 4, when the first brightness level is less than the second brightness level, the background is brighter than the subject. Therefore, the first brightness level having a lower brightness is desired to affect the exposure control data more than the second brightness level such that the exposure time may increase. For example in that case, a higher difference between the first and second brightness levels indicates a higher probability that the scene is back-lighted such that the first weight value applied to the first brightness level is desired to be higher than the second weight value applied to the second brightness level for increasing the exposure time.

Particularly, the difference between the first and second brightness levels is compared with a third threshold value (T3 in FIG. 5) (step S400 of FIG. 4). When the difference between the first and second brightness levels is less than the third threshold value, the probability of a back-lighted scene is small such that an average of the first and second brightness levels is provided as the exposure control data (i.e., the first and second weight values are each ½) (step S410 of FIG. 4).

When the difference between the first and second brightness is greater than or equal to the third threshold value, the difference between the first and second brightness is further compared with a fourth threshold value (T4 in FIG. 5) (step S420 of FIG. 4). When the difference between the first and second brightness levels is less than the fourth threshold value, the first weight value is increased, and the second weight value is decreased, substantially proportional to the difference between the first and second brightness levels (step S430 of FIG. 4).

For example, the first weight value applied to the first brightness level is set at a value in a range from about 0.5 to about 1 in proportion to the difference between the first and second brightness levels. In addition in that example, the second weight value applied to the second brightness level is set at a value in a range of from about 0.5 to about 0 inversely in proportion to the difference between the first and second brightness levels.

When the difference between the first and second brightness levels is greater than or equal to the fourth threshold value, the probability of a back-lighted scene is high. Thus in that case, the first weight value is set to 1, and the second weight value is set to 0 (step S440 of FIG. 4), and just the first brightness level is provided as the exposure control data.

Based on the adjusted first and second weight values, the exposure control data is generated (step S450 of FIG. 4). In one example embodiment of the present invention, the exposure control data is generated by summing a product of the first brightness level and the first weight value and a product of the second brightness level and the second weight value.

In this manner, the first brightness level is assigned higher weight in determining the exposure control data for a higher difference between the first and second brightness levels. Thus, a front-lighted or back-lighted scene is more precisely compensated by the automatic exposure in the camera according to above example embodiments of the present invention. The actual first and second weight values may be determined empirically with optimization for each respective camera.

Figure 5:
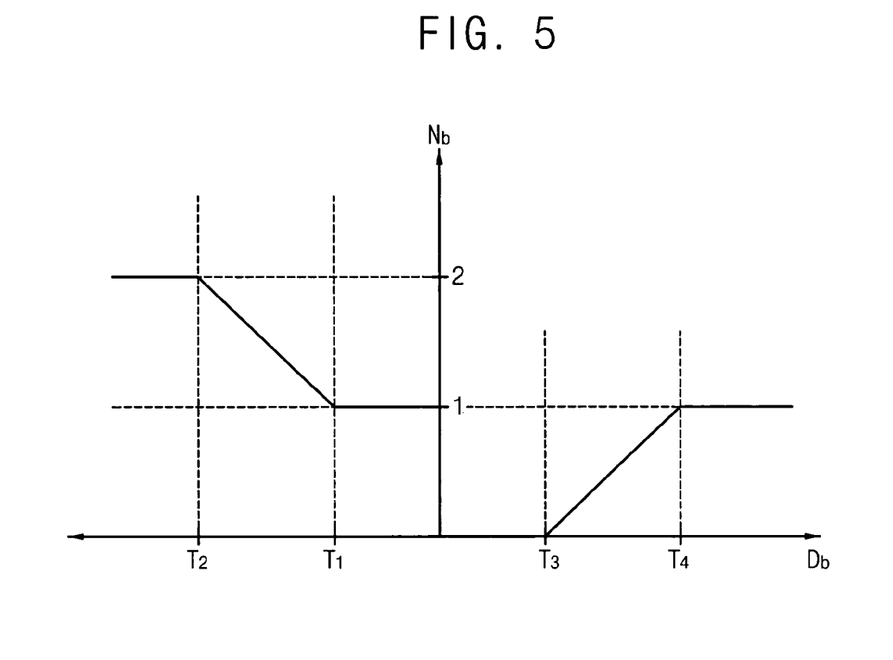
FIGS. 5 and 6 are graphs used for determining weight values in FIGS. 3 and 4, according to an example embodiment of the present invention.
Figure 6:
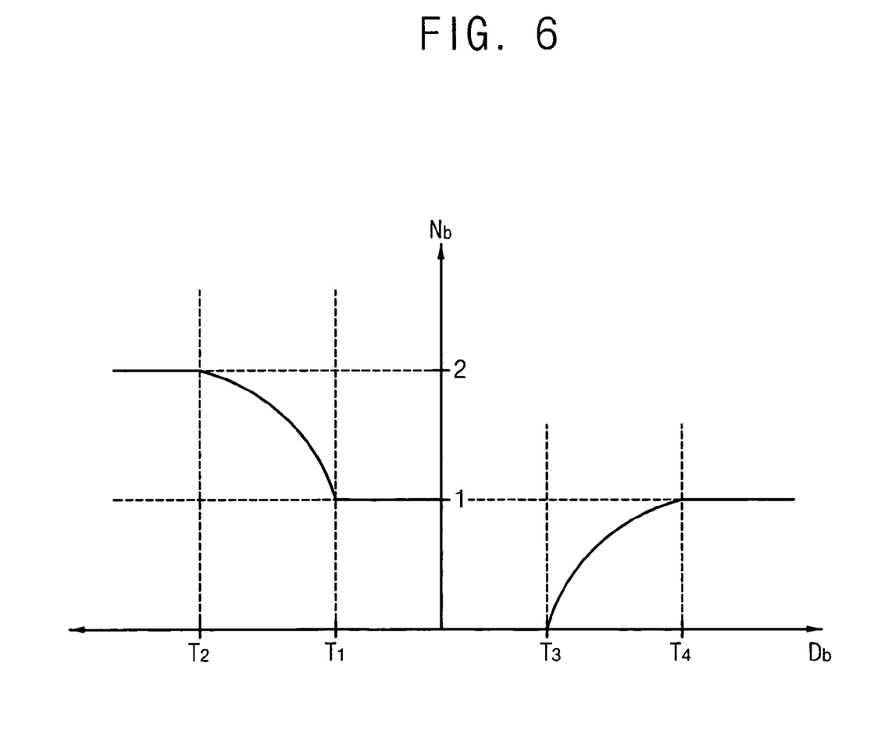

FIGS. 5 and 6 show graphs used to determine the weight values for the first and second brightness levels, according to an example embodiment of the present invention. In FIGS. 5 and 6, the x-axis is for a variable Db that represents the second brightness level minus the first brightness level, and the y-axis is for a parameter Nb used for determining the first and the second weight values.

For example, when the first brightness level is greater than the second brightness level, the first weight value applied to the first brightness level may have a value of Nb and the second weight value applied to the second brightness level may be zero. Alternatively, when the second brightness level is greater than the first brightness level, the first weight value applied to the first brightness level may have a value of (1+Nb)/2 and the second weight value applied to the second brightness level may have a value of (1−Nb)/2.

The relationship between the first and second weight values and the parameter value Nb herein is just provided as an illustrative example and may be controlled in any different way such that the first and second weight values are adjusted based on the brightness difference between the subject and the background.

Referring to FIGS. 5 and 6, when the difference (Db) between the second and first brightness levels is negative (i.e., the subject is brighter than the background) and the absolute value of the difference (|Db|) is less than or equal to an absolute value of the first threshold value |T1|, the first weight value applied to the first brightness level is set as 1 and the second weight value applied to the second brightness level is set as 0. In that case, the first brightness level is provided as the exposure control data.

When the absolute value of the difference (|Db|) between the first and second brightness level is between the absolute value of the first threshold value |T1| and an absolute value of a second threshold value |T2|, Nb has a value increasing proportional to the absolute value of the difference between the first and second brightness levels. In that case, the first weight value applied to the first brightness level is increased for generating the exposure control data. For example, Nb has a value between 1 and 2 increasing proportional to the absolute of the difference |Db|.

In FIG. 5, the value Nb is shown to be linearly proportional to the value |Db|, however alternatively, the value Nb may be exponentially proportional to the value |Db| as shown in FIG. 6. It is also noted that the values Nb and |Db| may be adjusted to follow any other suitable curve such that Nb and |Db| have a substantially proportional relationship.

When the value |Db| is greater than the absolute value of the second threshold value |T2|, Nb is set to a high value, such as 2 for example. In that case, the first brightness level is multiplied by 2 to generate the exposure control data such that the exposure time of the camera may be decreased for compensating the front-lighted subject.

When the difference Db is positive (i.e., the subject is darker than the background), and the value Db is less than or equal to an absolute value of a third threshold value |T3|, Nb is set to 0. Since the first weight value applied to the first brightness level is (1+Nb)/2 and the second weight value applied to the second brightness level is (1−Nb)/2, an average of the first and second brightness levels are provided as the exposure control data.

When the positive difference Db is between the absolute value of the third threshold value |T3| and an absolute value of a fourth threshold value |T4|, Nb has a value increasing in proportion to the difference Db. Namely, the first weight value applied to the first brightness level is increased in proportion to the difference Db, and the second weight value applied to the second brightness level is decreased inversely in proportion to the difference Db to generate the exposure control data.

For example, Nb has a value between 0 and 1 and increases in proportion to the difference Db when the difference Db is between T3 and T4. In that case, as Nb approaches 1, the first weight value applied to the first brightness level approaches 1, and the second weight value applied to the second brightness level approaches 0. When the difference Db is greater than the absolute value of the fourth threshold value |T4|, Nb is set to a value such as 1 to provide the first brightness level as the exposure control data.

The value Nb and the first and second weight values determined from Nb may vary depending on each respective camera such as manufacturing conditions of the camera, etc. In addition, although the value Nb is shown linearly proportional (or inversely proportional) to the difference Db when the absolute of the difference |Db| is in a range from |T3| to |T4| (or from |T1| to |T2|), the values |Nb| and |Db| may have a relationship such as a gamma curve and may be used in a gamma correction as shown in FIG. 6.

Figure 7:
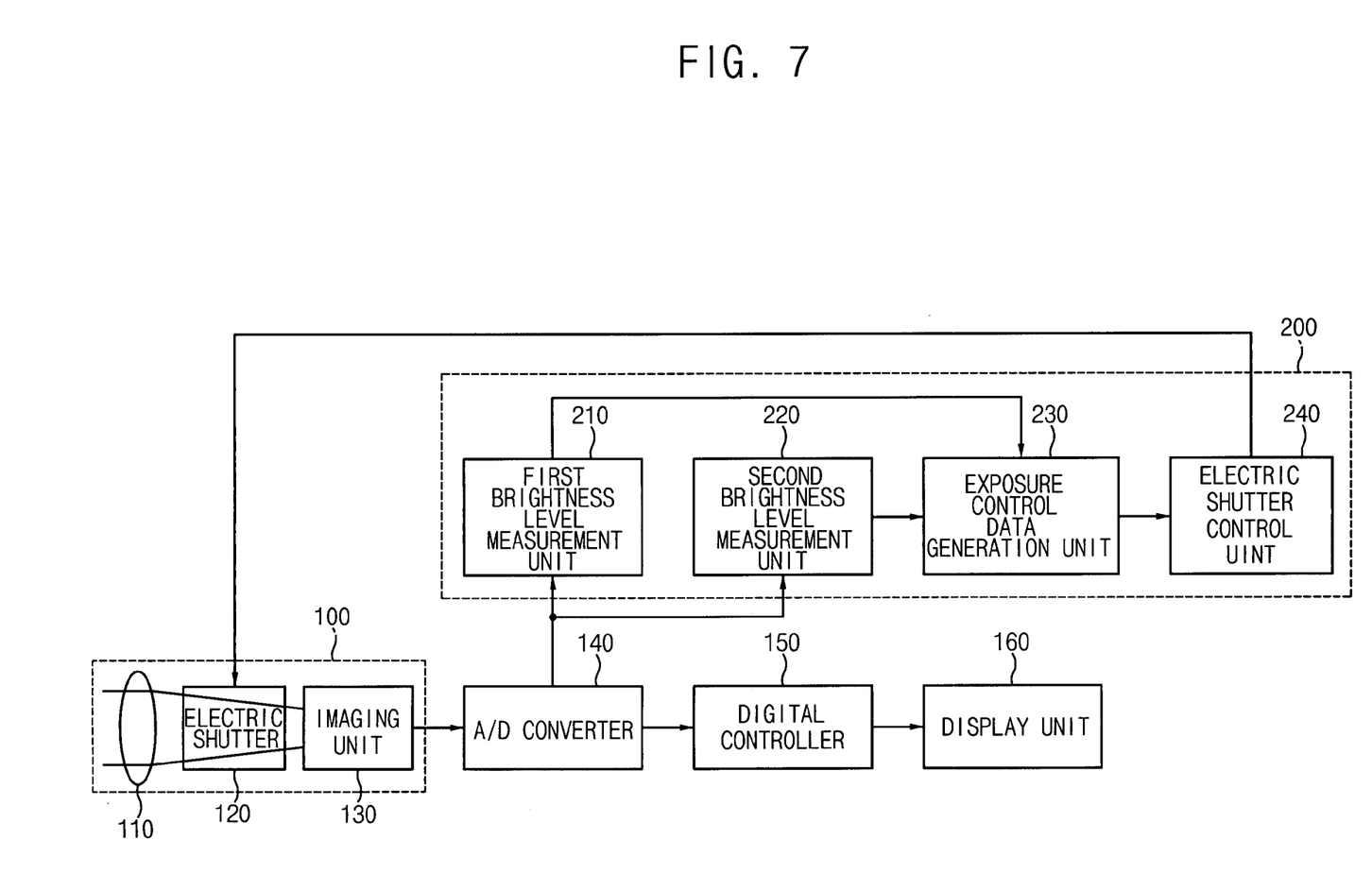
FIG. 7 is a block diagram of a camera system with an exposure control apparatus, according to an example embodiment of the present invention.

FIG. 7 is a block diagram of camera system having an exposure control unit according to an example embodiment of the present invention. Referring to FIG. 7, the camera system includes an image sensing unit 100, an analog-to-digital (A/D) converter 140, a digital controller 150, a display unit 160, and an exposure control unit 200.

The image sensing unit 100 includes a lens 110 for receiving an image, an electric shutter 120 for controlling an amount of incident light of the received image, and an imaging unit 130 for generating image data in response to the light received from the electric shutter 120. The image sensing unit 100 provides a captured image to the analog-to-digital converter 140.

The analog-to-digital converter 140 converts the image signal from the image sensing unit 100 into digital image data to perform digital signal processing. The digital controller 150 outputs the digital image data from the analog-to-digital converter 140 to the display unit 160 that displays the digital image data provided from the digital controller 150. The exposure control unit 200 includes a first brightness level measurement unit 210, a second brightness level measurement unit 220, an exposure control data generation unit 230, and an electric shutter control unit 240.

The components of the exposure control unit 200 perform the steps of the flow-charts of FIGS. 2, 3, and 4, according to an example embodiment of the present invention. Thus, the digital image data from the A/D converter 140 is divided into at least two sampling areas so as to extract the respective brightness level of each of the at least two sampling areas. The first and second brightness level measurement units 210 and 220 extract the first and second brightness levels from the first and second areas of the digital image data, respectively. For example, the first area corresponds to the subject, and the second area corresponds to the background.

The first brightness level is compared with the second brightness level, and the exposure control data is generated based on the comparison result, as described in reference to FIGS. 3 and 4 above. For example, first and second weight values respectively applied to the first and second brightness levels are set based on the difference between the first and second brightness levels, as described in reference to FIGS. 3 and 4 above.

The exposure control data generation unit 230 generates the exposure control data based on the first and second brightness levels and the first and second weight values. The exposure control data is then provided to the electric shutter control unit 240 that controls the electric shutter 120 of the image sensing unit 100 based on the exposure control data. The electric shutter control unit 240 controls the electric shutter such that the exposure time of the electric shutter 120 is decreased when the exposure control data is greater than a target value and is increased when the exposure control data is less than the target value.

The exposure control data is adjusted such that the brightness level of the subject is reflected in the automatic exposure. Namely, when the subject is brighter than the background, the brightness level of the subject having a higher brightness is provided to the automatic exposure so as to decrease the exposure time, and when the subject is darker than the background, the brightness level of the subject having a lower brightness is provided to the automatic exposure so as to increase the exposure time.

As described above, to achieve precise exposure control, brightness of the subject (e.g., a central brightness) and brightness of the background (e.g., a peripheral brightness) are measured so as to provide the brightness difference between such areas of the captured image. As the brightness difference becomes greater, the exposure is mainly controlled in accordance with the brightness of the subject to compensate for front-lighted or back-lighted scenes.

Namely, the weight values applied to the respective brightness levels of the subject and the background are adjusted according to the brightness difference such that the brightness of the subject has a larger effect on the exposure control. Particularly, when the subject is darker than the background by a predetermined degree, the subject is determined to be under-exposed. When the subject is brighter than the background by a predetermined degree, the subject is determined to be over-exposed. Thus, the exposure control effectively compensates for any back-lighted or front-lighted scenes.

In addition, when the respective brightness levels for the two areas of the captured image are used for the automatic exposure control, the hardware employed may be simpler. Therefore, the automatic exposure control according to the example embodiments of the present invention is suitable for mobile communication devices such as a mobile phone or a personal digital assistant (PDA).

While the present invention has been particularly shown and described with reference to exemplary embodiments thereof, it will be understood by those of ordinary skill in the art that various changes in form and details may be made therein without departing from the spirit and scope of the present invention as defined by the following claims. For example, any number of elements shown and described herein is by way of example only.

What is claimed is:

1. A method of controlling exposure in a camera, comprising:
    determining first and second brightness levels of first and second areas, respectively, of a captured image;
    determining first and second weight values for the first and second brightness levels, respectively, with an increase of the first weight value for a higher difference between the first and second brightness levels;
    generating exposure control data from the first and second weight values and the first and second brightness levels, wherein the first and second weight values are determined differently for multiple ranges between multiple threshold values of the difference between the first and second brightness level; and
    increasing the first weight value and decreasing the second weight value linearly with the difference between the first and second brightness levels.

2. The method of claim 1, wherein the first area includes a photographed subject, and wherein the second area corresponds to a background.

3. The method of claim 1, wherein the exposure control data is generated by summing a product of the first brightness level and the first weight value and a product of the second brightness level and the second weight value.

4. The method of claim 1, further comprising:
    adjusting a shutter speed of the camera based on the exposure control data.

5. The method of claim 1, wherein the determining the first and second weight values includes:
    setting the second weight value to about zero and the setting the first weight value to about one or more when the first brightness level is greater than the second brightness level and the brightness difference between the first and second brightness levels is greater than or equal to a first threshold value;
    setting the second weight value to about zero and the setting the first weight value to about two or more when the first brightness level is greater than the second brightness level and the brightness difference between the first and second brightness levels is greater than or equal to the first threshold value and a second threshold value; and
    setting the second weight value to about zero and the setting the first weight value to increase from 1 to 2 with the higher difference between the first and second brightness levels when the first brightness level is greater than the second brightness level and the brightness difference between the first and second brightness levels is greater than or equal to the first threshold value but less than the second threshold value.

6. The method of claim 1, wherein the determining the first and second weight values includes:
    setting the first and second weight values each to about ½ when the first brightness level is not greater than the second brightness level and the brightness difference between the first and second brightness levels is greater than or equal to a third threshold value;
    setting the first weight value to about 1 and setting the second weight value to about zero when the first brightness level is not greater than the second brightness level and the difference between the first and second brightness levels is less than the third threshold value and a fourth threshold value; and
    setting the first weight value to increase from about ½ to about 1 and setting the second weight value to decrease from about ½ to about zero with the higher difference between the first and second brightness levels when the first brightness level is not greater than the second brightness level and the difference between the first and second brightness levels is less than the third threshold value but greater than or equal to the fourth threshold value.

7. A method of controlling exposure in a camera, comprising:
    determining first and second brightness levels of first and second areas, respectively, of a captured image;
    determining first and second weight values for the first and second brightness levels, respectively, with an increase of the first weight value for a higher difference between the first and second brightness levels;
    generating exposure control data from the first and second weight values and the first and second brightness levels, wherein the first and second weight values are determined differently for multiple ranges between multiple threshold values of the difference between the first and second brightness levels; and
    increasing the first weight value and decreasing the second weight value exponentially with the difference between the first and second brightness levels.

8. The method of claim 7, wherein the first area includes a photographed subject, and wherein the second area corresponds to a background.

9. The method of claim 7, wherein the exposure control data is generated by summing a product of the first brightness level and the first weight value and a product of the second brightness level and the second weight value.

10. The method of claim 7, further comprising:
    adjusting a shutter speed of the camera based on the exposure control data.

11. The method of claim 7, wherein the determining the first and second weight values includes:
    setting the second weight value to about zero and the setting the first weight value to about one or more when the first brightness level is greater than the second brightness level and the brightness difference between the first and second brightness levels is greater than or equal to a first threshold value;
    setting the second weight value to about zero and the setting the first weight value to about two or more when the first brightness level is greater than the second brightness level and the brightness difference between the first and second brightness levels is greater than or equal to the first threshold value and a second threshold value; and setting the second weight value to about zero and the setting the first weight value to increase from 1 to 2 with the higher difference between the first and second brightness levels when the first brightness level is greater than the second brightness level and the brightness difference between the first and second brightness levels is greater than or equal to the first threshold value but less than the second threshold value.

12. The method of claim 7, wherein the determining the first and second weight values includes:

setting the first and second weight values each to about ½ when the first brightness level is not greater than the second brightness level and the brightness difference between the first and second brightness levels is greater than or equal to a third threshold value;

setting the first weight value to about 1 and setting the second weight value to about zero when the first brightness level is not greater than the second brightness level and the difference between the first and second brightness levels is less than the third threshold value and a fourth threshold value; and setting the first weight value to increase from about ½ to about 1 and setting the second weight value to decrease from about ½ to about zero with the higher difference between the first and second brightness levels when the first brightness level is not greater than the second brightness level and the difference between the first and second brightness levels is less than the third threshold value but greater than or equal to the fourth threshold value.

13. An exposure control unit of a camera, comprising:

first and second brightness level measurement units for determining first and second brightness levels of first and second areas, respectively, of a captured image; and an exposure control data generation unit for determining first and second weight values for the first and second brightness levels, respectively, with an increase of the first weight value for a higher difference between the first and second brightness levels, and for generating exposure control data from the first and second weight values and the first and second brightness levels, wherein the exposure control data generation unit determines the first and second weight values differently for multiple ranges between multiple threshold values of the difference between the first and second brightness levels;

and wherein the exposure control data generation unit increases the first weight value and decreases the second weight value linearly or exponentially with the difference between the first and second brightness levels.

14. The exposure control unit of claim 13, further comprising:

a shutter control unit for adjusting a shutter speed of the camera based on the exposure control data.

15. The exposure control unit of claim 13, wherein the first area includes a photographed subject, and wherein the second area corresponds to a background.

16. The exposure control unit of claim 13, wherein the exposure control data generation unit generates the exposure control data by summing a product of the first brightness level and the first weight value and a product of the second brightness level and the second weight value.

17. The exposure control unit of claim 13, wherein the exposure control data generation unit determines the first and second weight values by:

setting the second weight value to about zero and the setting the first weight value to about one or more when the first brightness level is greater than the second brightness level and the brightness difference between the first and second brightness levels is greater than or equal to a first threshold value;

setting the second weight value to about zero and the setting the first weight value to about two or more when the first brightness level is greater than the second brightness level and the brightness difference between the first and second brightness levels is greater than or equal to the first threshold value and a second threshold value; and setting the second weight value to about zero and the setting the first weight value to increase from 1 to 2 with the higher difference between the first and second brightness levels when the first brightness level is greater than the second brightness level and the brightness difference between the first and second brightness levels is greater than or equal to the first threshold value but less than the second threshold value.

18. The exposure control unit of claim 13, wherein the exposure control data generation unit determines the first and second weight values by:

setting the first and second weight values each to about ½ when the first brightness level is not greater than the second brightness level and the brightness difference between the first and second brightness levels is greater than or equal to a third threshold value;

setting the first weight value to about 1 and setting the second weight value to about zero when the first brightness level is not greater than the second brightness level and the difference between the first and second brightness levels is less than the third threshold value and a fourth threshold value; and setting the first weight value to increase from about ½ to about 1 and setting the second weight value to decrease from about ½ to about zero with the higher difference between the first and second brightness levels when the first brightness level is not greater than the second brightness level and the difference between the first and second brightness levels is less than the third threshold value but greater than or equal to the fourth threshold value.

* * * * *